United States Patent [19]
Begun et al.

[11] Patent Number: 5,450,559
[45] Date of Patent: Sep. 12, 1995

[54] MICROCOMPUTER SYSTEM EMPLOYING ADDRESS OFFSET MECHANISM TO INCREASE THE SUPPORTED CACHE MEMORY CAPACITY

[75] Inventors: Ralph M. Begun, Boca Raton; Patrick M. Bland; Mark E. Dean, both of Delray Beach, all of Fla.

[73] Assignee: International Business Machines Corporation, Armonk, N.Y.

[21] Appl. No.: 771,528

[22] Filed: Oct. 7, 1991

Related U.S. Application Data

[63] Continuation of Ser. No. 358,807, May 31, 1989, abandoned.

[51] Int. Cl.$^6$ .............................................. G06F 12/08
[52] U.S. Cl. ..................... 395/403; 364/DIG. 1; 364/243; 364/243.4; 364/243.41; 364/245; 364/245.31; 395/308; 395/465; 395/481
[58] Field of Search ................. 364/DIG. 1, DIG. 2; 395/400, 425, 800, 325

[56] References Cited

U.S. PATENT DOCUMENTS

| | | | |
|---|---|---|---|
| 4,056,845 | 11/1977 | Churchill, Jr. | 395/425 |
| 4,315,312 | 2/1982 | Schmidt | 395/425 |
| 4,317,168 | 2/1982 | Messina et al. | 364/200 |
| 4,332,010 | 5/1982 | Messina et al. | 364/200 |
| 4,381,541 | 4/1983 | Baumann | 364/200 |
| 4,400,774 | 8/1983 | Toy | 395/425 |
| 4,493,026 | 1/1985 | Olnowich | 364/200 |
| 4,577,293 | 3/1986 | Matick et al. | 365/189.04 |
| 4,654,782 | 3/1987 | Bannai et al. | 395/400 |
| 4,669,043 | 5/1987 | Kaplinsky | 364/200 |
| 4,797,814 | 1/1989 | Brenza | 364/200 |
| 4,833,642 | 5/1989 | Ooi | 365/49 |
| 4,901,228 | 2/1990 | Kodama | 395/575 |
| 4,905,188 | 2/1990 | Chuang et al. | 395/425 |
| 4,947,319 | 8/1990 | Bozman | 395/425 |
| 5,034,917 | 7/1991 | Bland et al. | 395/425 |
| 5,041,962 | 8/1991 | Lunsford | 395/325 |
| 5,045,998 | 9/1991 | Begun et al. | 395/325 |
| 5,091,850 | 2/1992 | Culley | 395/400 |

FOREIGN PATENT DOCUMENTS

| | | |
|---|---|---|
| 58-19970 | 2/1983 | Japan . |
| 61-13354 | 1/1986 | Japan . |
| 61-20155 | 1/1986 | Japan . |
| 61-231641 | 10/1986 | Japan . |
| 62-61135 | 3/1987 | Japan . |
| 62-67650 | 3/1987 | Japan . |
| 62-118456 | 5/1987 | Japan . |
| 62-194563 | 8/1987 | Japan . |

OTHER PUBLICATIONS

"82385 High Performance 32-Bit Cache Controller," *Microprocessor and Peripheral Handbook*, vol. 1, Intel Corp., pp. 4-287 to 4-330 (1988).
Affinito, "Prefetch Cache for Data Search with Limited Multiple-Porting", *IBM Technical Disclosure Bulletin*, vol. 27, No. 7A, Dec. 1984, pp. 4028-4030.
Kurtz et al, "Extending the Addressing Capabilities of the IBM Series/1 to 32 Bits", *IBM Technical Disclosure Bulletin*, vol. 29, No. 4, Sep. 1986, pp. 1494-1501.
"Compaq Unveils 33-MHz Deskpro as Top Machine", *Infoworld*, May 29, 1989.
"80386 Hardware Reference Manual", *Intel Corp.*, 1986, Chapter 7, Cache Subsystems, pp. 7-1-7-16.
"Introduction to the 80386 including the 80386 Data Sheet", *Intel Corp.*, Apr. 1986.
"Microprocessor and Peripheral Handbook, vol. I, Microprocessor", *Intel Corp.*, 1989, Chapter 4, Intel 38 Family, Data Sheets, 82385 High Performance 32-Bit Cach Controller, pp. 4-292-4-353.

*Primary Examiner*—Paul V. Kulik
*Attorney, Agent, or Firm*—Pollock, Vande Sande & Priddy

[57] ABSTRACT

The capacity of cache memory supported by a cache controller can be increased by offsetting the relationship between CPU address output terminals and address input terminals of the cache controller and correspondingly doubling the cache line size. In some cases, additional logic generates a hidden memory cycle so as to fetch from memory that number of bytes equal to the new line size regardless of the width of the data bus. The hidden memory cycle is initiated by a read miss and further logic generates a memory address which is not generated by the CPU. The hidden memory cycle is maintained transparent to the CPU and cache controller by inhibiting the change in a READY signal until completion of both the normal memory cycle and the hidden memory cycle.

14 Claims, 6 Drawing Sheets

DIRECT-MAPPED TAG FIELD

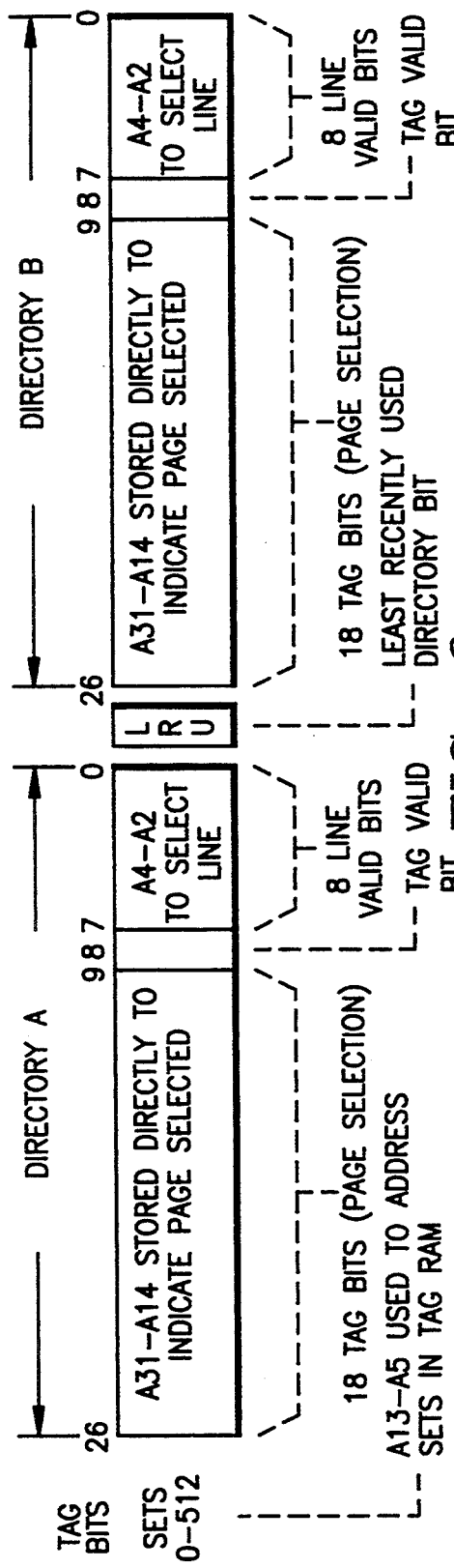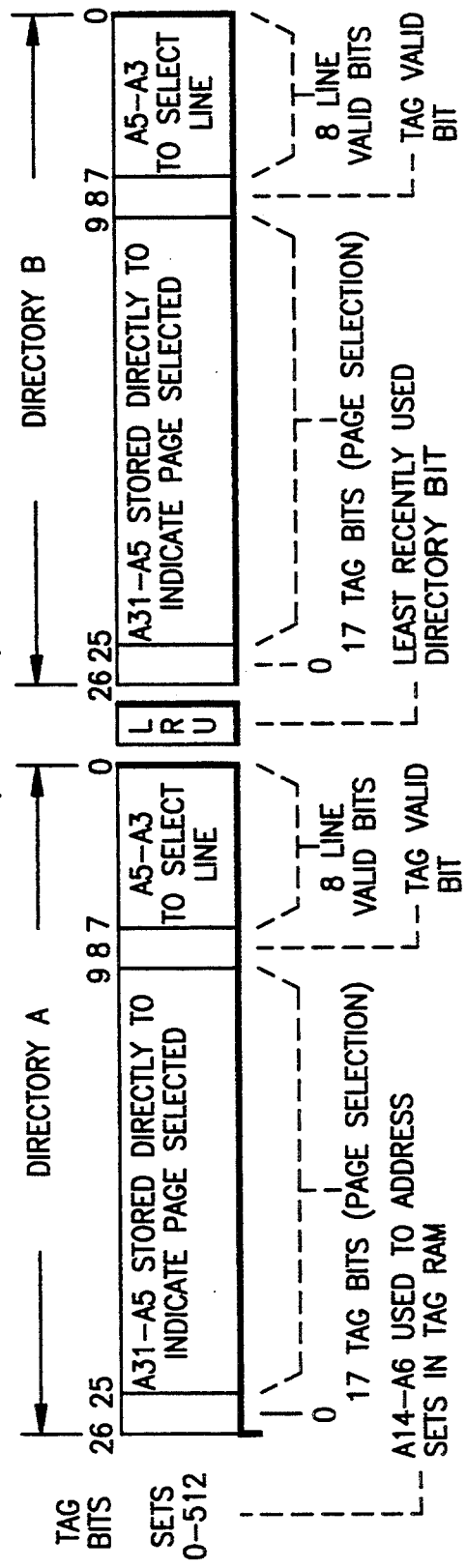
FIG. 6 (PRIOR ART)
FIG. 7

[CACHE INITIALLY FLUSHED]

| STEP | CACHE DIRECTORY | LINE VALID BYTE (1=INVALID, 0=VALID) | RESULT |
|---|---|---|---|
| ① CPU Rd 0 | SET TAG VALID AT DIRECTORY ADR0 | 11111110 | fetch dword 0<br>fetch dword 4 |
| ② CPU Rd 4 | CACHE HIT  NO CHANGES | | |
| ③ CPU Rd 8 | UPDATE LINE VALID BYTE | 11111100 | fetch dword 8<br>fetch dword C |

FIG. 9

MICROCOMPUTER SYSTEM EMPLOYING ADDRESS OFFSET MECHANISM TO INCREASE THE SUPPORTED CACHE MEMORY CAPACITY

This is a continuation of application Ser. No. 07/358,807, filed on May 31, 1989 now abandoned.

DESCRIPTION

Technical Field

The present invention relates to microcomputer systems, particularly microcomputer systems employing a cache subsystem.

CROSS-REFERENCE TO RELATED APPLICATIONS

This application is related to the following copending applications, all assigned to the assignee of this invention.

U.S. patent application Ser. No. 198,893, filed May 26, 1988, in the names of Ralph M. Begun, Patrick M. Bland and Mark E. Dean, entitled "Method and Apparatus for Selectively Posting Write Cycles Using the 82385 Cache Controller", abandoned in favor of Continuation-In-Part application Ser. No. 359,794, filed Jun. 1, 1989, now U.S. Pat. No. 5,045,998;

U.S. patent application Ser. No. 198,895, filed May 26, 1988, in the names of Patrick M. Bland, Mark E. Dean and Philip E. Milling, entitled "System Bus Pre-empt for 80386 when Running in an 80386/82385 Microcomputer System with Arbitration", now U.S. Pat. No. 5,129,090;

U.S. patent application Ser. No. 198,894, filed May 26, 1988, in the names of Patrick M. Bland, Ralph M. Begun and Mark E. Dean, entitled "Control of Pipelined Operation in a Microcomputer System Employing Dynamic Bus Sizing with 80386 Processor and 82385 Cache Controller" now U.S. Pat. No. 5,125,084; and U.S. patent application Ser. No. 198,890, filed May 26, 1988, in the names of Ralph M. Begun, Patrick M. Bland and Mark E. Dean, entitled "Delayed Cache Write Enable Circuit for a Dual Bus Microcomputer System with an 80386 and 82385", now U.S. Pat. No. 5,175,826.

The disclosure of the foregoing are incorporated herein by this reference.

BACKGROUND ART

The use of cache subsystems in microcomputer systems leads to a number of attractive operating advantages. Because the advantages which are derived from the use of a cache subsystem depend, in part, on the size of the cache memory, there is a desire to increase the size of the cache memory. Microcomputer systems employing cache subsystems are in effect dual bus microcomputers. The CPU and cache subsystem are connected together via what can be referred to as a CPU local bus. Separate from the CPU local bus is a system bus to which other devices (I/O devices, additional memory, etc.) can be connected. The presence of the cache subsystem relieves the system bus from any read memory access to the extent that the information sought is also found in the cache subsystem. Because not all desired information will be found in the cache subsystem, and write operations are usually directed to both the cache subsystem and to memory, there must of course be some connection between the system bus and the CPU local bus.

Caching data from a memory device to support fast access times from a given CPU is not a new idea. Many systems containing first and second level caches have been developed and marketed. Because CPU clock speeds are increasing, which in turn is reducing the minimum cycle times, caches are being developed for personal computer systems to maximize their performance. Many companies (Intel, Hitachi, NEC, Toshiba, etc.) are developing and marketing cache controller chips and subsystems. Most are limited by the amount of available tag RAM and can only support a maximum of 32 KB of cache data RAM.

One popular class of dual bus microcomputers includes the 82385 cache controller. As sold by the manufacturer, the 82385 cache controller is limited to handling cache memory of up to 32 KB. It would be desirable to increase the capacity of the cache memory in such microcomputer systems beyond 32 KB. The 82385 specifications and functional description can be found in the Intel "Microprocessor and Peripheral Handbook" and in "82385 High Performance 32-Bit Cache Controller" (1987). See also "Introduction to the 80386" and the 80386 Hardware Reference Manual (1986) also from Intel.

SUMMARY OF THE INVENTION

Accordingly, it is a prime object of the present invention to provide a dual bus microcomputer system employing the 82385 cache controller where the cache memory is in excess of 32 KB. It is another object to provide apparatus to increase supported cache memory where the cache controller per se cannot support such increased cache memory capacity.

As will be described, the invention provides an architecture and/or a method for increasing the cache RAM supportable by an 82385 cache controller to at least 64 KB. This architecture can also be used on any cache controller designed to support a given amount of cache RAM and provide the capability of at least doubling that cache RAM. The technique described herein to increase or double the cache RAM size does not require additional tag RAM and only requires a minimal amount of additional support logic.

The 82385, internally, includes four components. The 82385 includes an 82385 local bus interface, interfacing to the microcomputer system bus, there is a processor interface, interfacing to the 80386 control bus, there is a cache directory which has inputs both from the 80386 address bus as well as from the "snoop" bus and finally, there is a cache control, to actually control the cache memory. Since the cache memory is external to the 82385, physically changing the size of the cache memory is only inhibited by the organization of the cache directory, which is internal to the 82385 and hence not alterable.

The internal cache directory provides space for 1024 tags. In a 32 KB cache, each tag represents 32 bytes. Because of the 32-bit data bus, a single main memory reference can (and does) access not one byte, but four; the four bytes which are accessed are called a line. Accordingly, each tag represents eight lines. Since the cache directory is internal to the cache controller and therefore cannot be altered, in accordance with the invention cache memory capacity is increased by increasing the line size. In a preferred embodiment, the line size has been doubled from four bytes to eight, i.e.

64 bits. By doubling the line size, the tags still represent eight lines, but now each line is eight bytes, not four.

Because the tag directory capacity cannot be increased, then each tag must represent 64 bytes, as opposed to 32 bytes. This is accomplished by shifting the significance of the address lines in the tag organization by one bit.

In the manufacturer's documents address bus lines are described as connected to corresponding address output pins on the CPU. The address lines are connected to corresponding address input pins of the cache controller and in this fashion an address output pin of the CPU is connected to the corresponding address input pin of the cache controller. In order to accurately describe the present invention, because of the address line shift, different nomenclature will be used. More particularly address output pins of the CPU will be identified with the prefix "A", the corresponding address line of the address bus carries the identical reference character (this is conventional). However address input pins of the cache controller will be identified with a "CC" prefix. System bus address lines are identified with a "BA" prefix and system bus data lines are identified with a "BD" prefix.

More particularly, address pins A3-A30 from the 80386 are connected to address pins CCA2-CCA29 in the 82385 (address input CCA30 of the 82385 is grounded and address output A31 of the 80386 is connected to input CCA31 of the 82385). At the same time, the line size of the 64 KB cache memory is increased from four bytes to eight. Given the single read cycle capacity of 32 bits (in an 80386/82385 machine), there arises a need to create an extra read cycle for every read miss. The extra read cycle is required to maintain the 80386 interface to the system. In other words, the 80386 and 82385 are designed to access a line per read miss cycle. Because the new line is eight bytes (not four), some changes are necessary to maintain this interface. The change effected is to generate a second read cycle (transparent to both the 82385 and 80386) to access the second four bytes of the line. The first read cycle extracts half (four bytes) of the new line size, whereas the second read cycle extracts the other four bytes (the remaining 32 bits) of the new line size. In one of the two read cycles, an address is generated by added logic which is not an address supplied by the CPU. More particularly, address line A2 (from the 80386) is inverted and used to fetch an initial four bytes which is stored in the cache RAM. Thereafter, line A2 (non-inverted) is again passed to the system to address a second group of 32 bits. The data read during the second read cycle is presented to the processor and also stored in the cache RAM. The second cycle is created by generating an alternate address strobe signal (/MISS1). /MISS1 is used by the system bus interface unit (Micro Channel (TM) or other system bus) and local bus memory interface as an alternate /BADS signal (the 82385 address strobe). The second cycle looks like a pipelined processor cycle to the system interfaces. Therefore, either /BADS or /MISS1 can initiate a bus cycle. As an alternative to the generation of a second read cycle, the data interface to the memory device can be increased from 32 to 64 bits. This alternative, however, will require fast DRAMs and SRAMs because of an extra cross-over buffer needed to gate the proper data to the 80386. This variant would significantly improve performance over the 82385 cache interface.

In addition and in accordance with a preferred embodiment, the READY signal to the 82385 and the 80386 is held active until the end of the second read miss bus cycle. The first 32 bits (the first read cycle) is stored in the cache RAM by pulsing SRAMCS2 chip select. This signal is tied to an active high chip select input of the SRAM. SRAMCS2 is normally active and goes inactive at the end of the first read cycle of a cache or a read miss. It goes active again one CLK2 clock cycle later.

In order to accommodate SNOOP operations, the snoop address must also be shifted by one bit. This is implemented by connecting system bus address signals BA3-BA23 to the 82385 snoop address terminals SA2-SA22, respectively. The signal ADRNABLE is connected to the 82385 snoop address signal SA23. ADRNABLE is low for all snoop addresses less than 16 megabytes and is high for all snoop addresses greater than or equal to 16 megabytes. This allows cache invalidate cycles to function properly for system masters capable of 24-bit addressing or 32-bit addressing. The use of ADRNABLE as a snoop address does limit the maximum snoopable memory space to 32 megabytes. ADRNABLE is required as an input to the 82385 because system masters driving only 24 bits of address do not drive SA24-SA31, which would have limited the snoopable address space to 16 megabytes. These inputs (SA24-SA31) on the 82385 are connected to ground (or are low).

It should also be apparent that the technique of offsetting the relationship between CPU address outputs and cache controller address inputs can be used to increase supported cache memory capacity for cache controllers other than the 82385.

Accordingly, with respect to one aspect the invention provides a multi-bus microcomputer system comprising:

a CPU and a cache subsystem connected together by a CPU local bus, said cache subsystem including a cache controller and a cache memory, a system bus means connecting said cache controller to a random access memory and a plurality of addressable functional units, wherein said CPU has addressing outputs and said cache controller has addressing inputs, means connecting some of said CPU addressing outputs to some of said addressing inputs of said cache controller so that CPU addressing outputs are not connected to corresponding addressing inputs of said cache controller, and means connecting at least one addressing output of said CPU to address-logic generator means for generating addressing inputs to said random access memory which are not generated by said CPU.

In accordance with one specific embodiment of the invention, CPU addressing outputs A3-A30 are connected to addressing inputs CCA2-CCA29 of the cache controller and the CPU addressing output A2 is connected to the address logic generator means.

In one specific embodiment according to the invention, the 82385 cache controller and the logic added in accordance with the present invention provides a system to support a 64 KB cache.

BRIEF DESCRIPTION OF THE DRAWINGS

FIG. 6 shows the contents of typical tag registers in directory A and directory B of the cache directory of FIG. 3 for a prior art two-way set associative cache organization;

FIG. 7 represents the contents of typical tag registers for directory A and directory B of the cache directory of FIG. 3 for a two-way set associative cache organization in employing the present invention;

FIG. 9 is an example of three memory read commands executed by the CPU when employing the principles of the present invention.

DETAILED DESCRIPTION OF PREFERRED EMBODIMENTS

Figure 1:
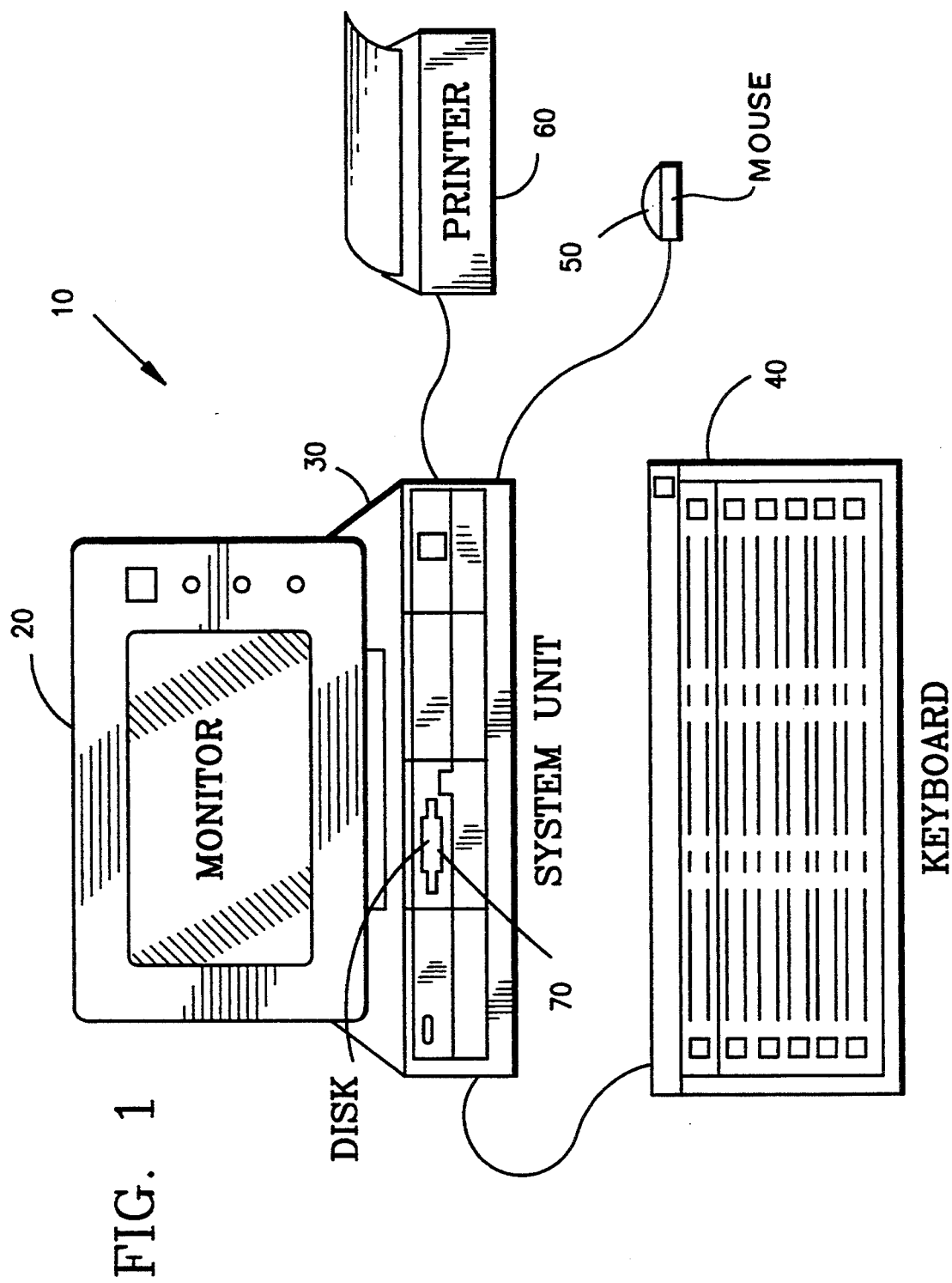
FIG. 1 is an overall three-dimensional view of a typical microcomputer system employing the present invention.

FIG. 1 shows a typical microcomputer system in which the present invention can be employed. As shown, the microcomputer system 10 comprises a number of components which are interconnected together. More particularly, a system unit 30 is coupled to and drives a monitor 20 (such as a conventional video display). The system unit 30 is also coupled to input devices such as a keyboard 40 and a mouse 50. An output device such as a printer 60 can also be connected to the system unit 30. Finally, the system unit 30 may include one or more disk drives, such as the disk drive 70. As will be described below, the system unit 30 responds to input devices such as the keyboard 40 and the mouse 50, and input/output devices such as the disk drive 70 for providing signals to drive output devices such as the monitor 20 and the printer 60. Of course, those skilled in the art are aware that other conventional components can also be connected to the system unit 30 for interaction therewith. In accordance with the present invention, the microcomputer system 10 includes (as will be more particularly described below) a cache memory subsystem such that there is a CPU local bus interconnecting a processor, a cache control and a cache memory which CPU local bus is coupled via a buffer to a system bus. The system bus is interconnected to and interacts with the I/O devices such as the keyboard 40, mouse 50, disk drive 70, monitor 20 and printer 60. Furthermore, in accordance with the present invention, the system unit 30 may also include a third bus comprising a Micro Channel (TM) bus for interconnection between the system bus and other (optional) input/output devices, memory, etc.

Figure 2:
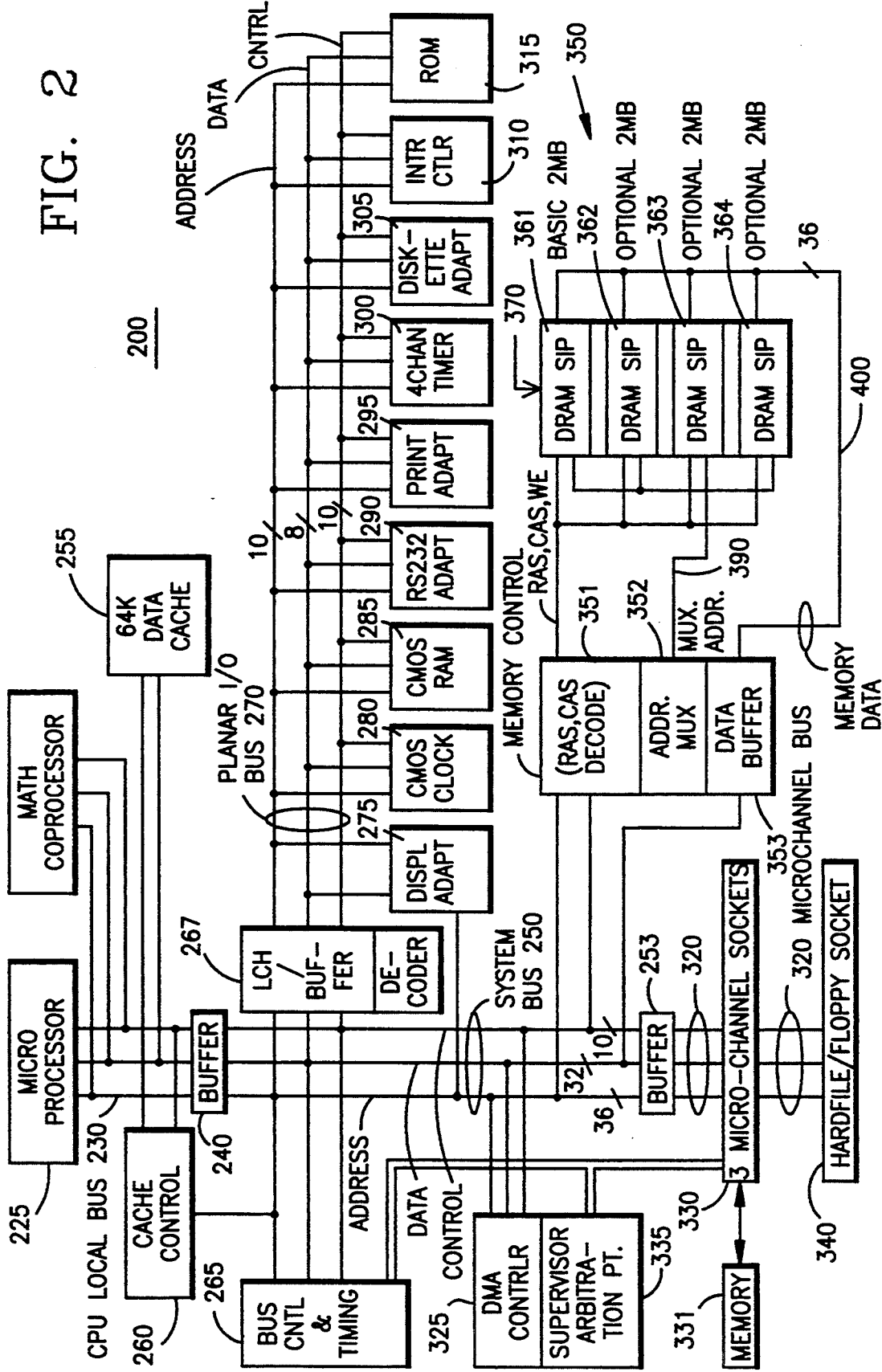
FIG. 2 is a detail block diagram of a majority of the components of a typical microcomputer system employing the present invention.

FIG. 2 is a high level block diagram illustrating the various components of a typical microcomputer system in accordance with the present invention. A CPU local bus 230 (comprising data, address and control components) provides for the connection of a microprocessor 225 (such as an 80386), a cache controller 260 (which may include an 82385 cache controller) and a random access cache memory 255. Also coupled on the CPU local bus 230 is a buffer 240. The buffer 240 is itself connected to the system bus 250, also comprising address, data and control components. The system bus 250 extends between the buffer 240 and a further buffer 253.

The system bus 250 is also connected to a bus control and timing element 265 and a DMA controller 325. An arbitration control bus 340 couples the bus control and timing element 265 and a central arbitration element 335. Memory 350 is also connected to the system bus 250. The memory 350 includes a memory control element 351, an address multiplexer 352 and a data buffer 353. These elements are interconnected with memory elements 360 through 364, as shown in FIG. 2.

A further buffer 254 is coupled between the system bus 250 and a planar bus 270. The planar bus 270 includes address data and control components, respectively. Coupled along the planar bus 270 are a variety of I/O adaptors and other components such as the display adaptor 275 (which is used to drive the monitor 20), a clock 280, additional random access memory 285, an RS 232 adaptor 290 (used for serial I/O operations), a printer adaptor 295 (which can be used to drive the printer 60), a timer 300, a diskette adaptor 305 (which cooperates with the disk drive 70), an interrupt controller 310 and read only memory 315. The buffer 253 provides an interface between system bus 250 and an optional feature bus such as the Micro Channel (TM) bus 320 represented by the Micro Channel (TM) sockets. Devices such as memory 331 may be coupled to the bus 320.

While data for cache writes may be derived from memory 350, such data may also be derived from other memory such as memory installed on the Micro Channel (TM) bus.

Figure 3:
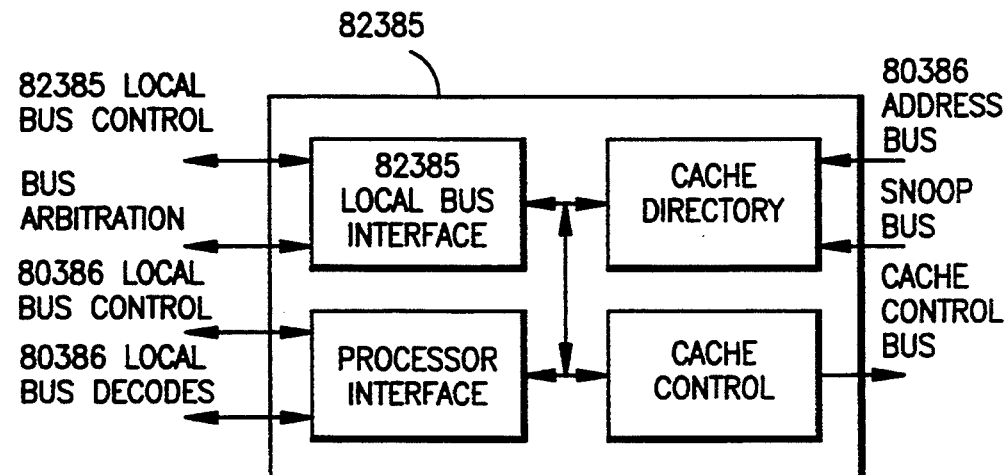
FIG. 3 is a block diagram showing the internal construction of a cache controller such as the 82385.

FIG. 3 is a block diagram, taken from the Intel publication "82385 High Performance 32-Bit Cache Controller" (1987). FIG. 3 shows that internally the 82385 includes four components: a local bus interface, a processor interface, a cache control and a cache directory. Significant to the goal of the present invention, to increase the capacity of the cache memory, is the fact that the cache directory is internal to the 82385. This means that the capacity of the cache directory cannot be altered. Furthermore, and just as significantly, there can be no alteration between the contents of the cache directory and the information applied to the cache directory from the 80386 address bus.

Figure 4:
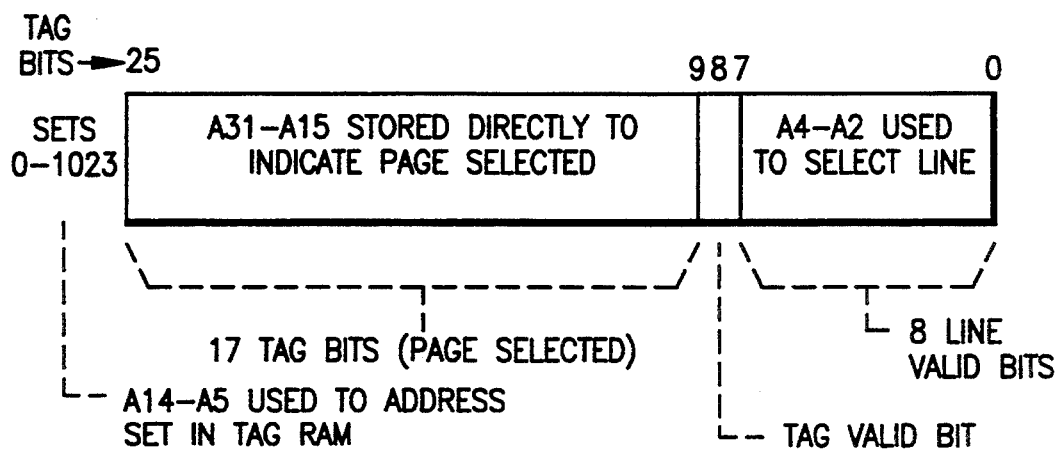
FIG. 4 shows the contents of a typical tag register in the cache directory of FIG. 3 for a prior art direct mapped cache organization.

The prior art evidences many techniques for organizing a cache and selecting the relationship between the cache memory and main memory. One popular technique is referred to as direct mapping, another popular technique is referred to as two-way set associative. The 80386 address bus is 32 bits wide and thus the 82385 has addressing inputs CCA0–CCA31. In a direct mapping mode, the cache directory includes 1024 26-bit registers. Each register of the 1024 is partitioned as shown in FIG. 4. Bits 0–7 (eight bits) are created by the cache control element. These are line-valid bits, one for each line in the cache. The Intel recommendation for the 82385 using a 32 KB cache (the maximum allowed) associates one entry in a direct mapped tag field directory with eight lines of data, where each line is four bytes. Bit 8 is the tag valid bit, also created by the cache control. Bits 9–25 correspond to address bits A31–A15, which are stored directly as provided over the 80386 address bus. In the Intel-recommended architecture, addressing output bits A2–A31 from the 80386 are connected directly to corresponding address inputs of the 82385, i.e. CCA2–CCA31. However, as will be described below, in accordance with the present invention, that recommendation is not followed and in fact there is a "offset" or shift between some of the 80386 address output bits and the address bus input terminals on the 82385.

Address bits A14–A5 are used to address the tag RAM directory. Those skilled in the art will recognize that these ten bits are sufficient to select one out of 1024 registers. Address bits A4–A2 (three bits) are used to select one of eight lines.

FIG. 6 illustrates the organization of the cache directory for two-way set associative organization. In this organization the 1024 registers are divided in half to provide 512 27-bit registers in a directory A and another 512 27-bit registers in a directory B. Referring initially to the typical register for directory A, bits 0–7 are again eight line valid bits, created and stored in the cache directory by the cache controller. Each line valid bit represents a 4-byte line. Bit 8 is again a tag valid bit and bits 9–26 correspond to 80386 address bits A31–A14 which are stored directly to indicate a selected page. Address bits A13–A5 (nine bits) are sufficient to select one register from the 512 in the directory. Directory B is organized in a similar fashion. Again, as was the case in the organization described with reference to FIG. 4, address bits A2–A4 (three bits) are sufficient to select one of the eight lines represented by the tag (again, a line is four bytes). Finally, for each tag pair, there is a LRU bit (Least Recently Used). The bit is set or reset by the cache controller to indicate whether the next entry should be made to directory A or directory B, respectively.

Given this fixed organization and fixed capacity of the cache directory and given the necessity to maintain an unchanging relationship between 80386 addressing output bits and main memory, the goal of the invention is to fashion an architecture for supporting a 64 KB cache. With the direct mapped tag architecture, each of the 1024 directory entries represent eight lines. Since each line is four bytes, those skilled in the art can see how the maximum capacity of the cache memory using this architecture is 32 KB. The two-way set associative architecture (FIG. 6) yields the same result.

Figure 5:
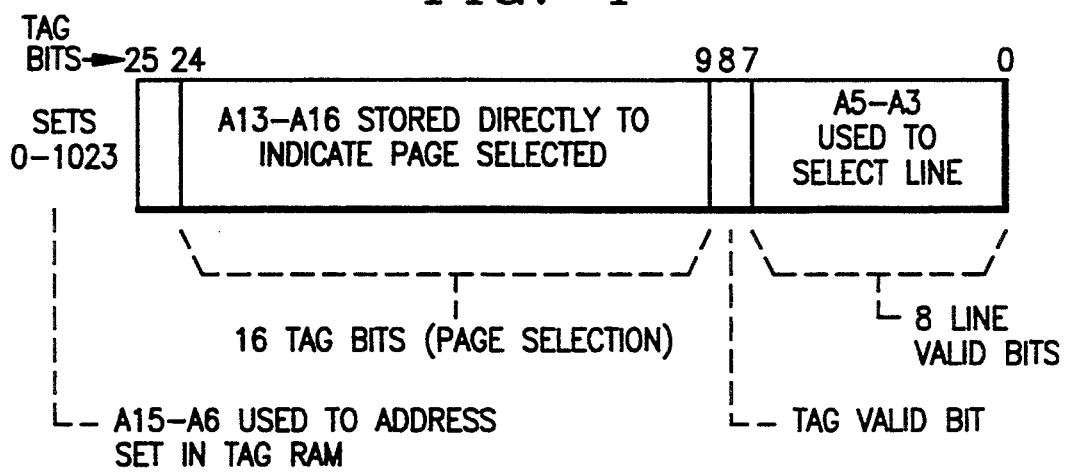
FIG. 5 shows the contents of a typical tag register of the cache directory of FIG. 3 for direct mapped cache organization when using the present invention.

In accordance with the present invention, the line size has been changed from four bytes to eight. FIG. 5 shows the corresponding cache directory organization for a direct mapped tag field. As shown in FIG. 5, bits 0–7 still represent eight line valid bits; these bits are written and rewritten by the cache control, entirely transparent to the fact that each line now represents eight bytes instead of four. Bit 8 is still a tag valid bit. Rather than using bits A2–A4 to select a line, bits A3–A5 are now used to select the line. As a result, bits A6–A15 are used to address registers in the cache directory (in contrast to the use of bits A5–A14 as shown in FIG. 4). Accordingly, the directory now includes a 16-bit tag field, bits A16–A31. The foregoing data then occupies bit positions 0–24, leaving bit position 25 empty.

FIG. 7 illustrates a similar relationship to FIG. 6 as FIG. 5 had to FIG. 4. More particularly, each tag register still has eight line valid bits, although these eight line valid bits each represents 8-byte lines as opposed to 4-byte lines. Bits A3–A5 are used to select a given 8-byte line. The eighth bit again is the tag valid bit. Bits A6–A14 are now used to address the tag registers (as opposed to the use of bits A5–A13 in FIG. 6). Accordingly, bits A15–A31 (instead of A14–A31) are stored directly to indicate the selected page.

Figure 8:
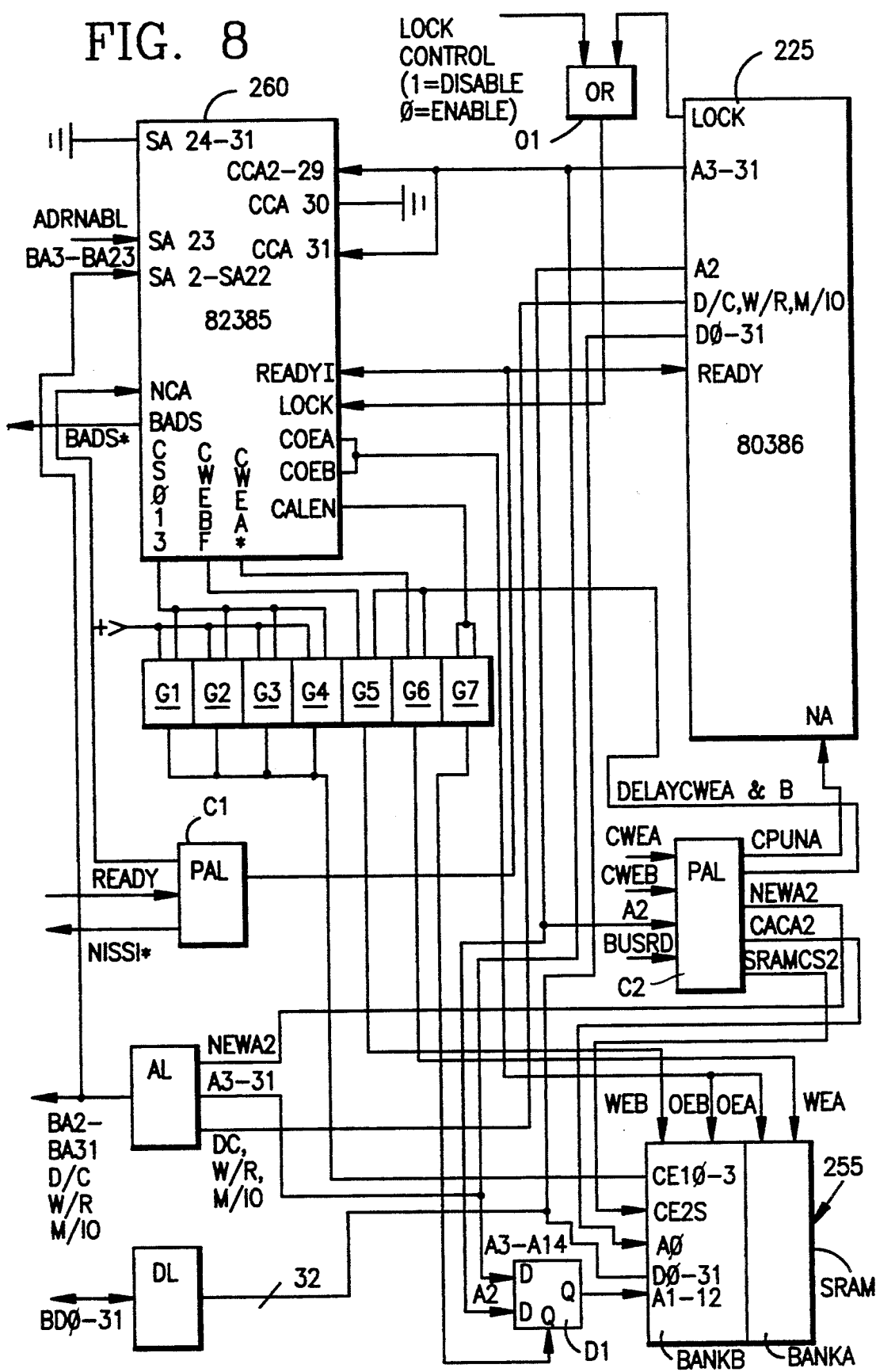
FIG. 8 is a detail block diagram of a portion of FIG. 2 showing the interconnection of the CPU 225, cache controller 260, cache memory 255 with each other, the system bus and added logic C1, C2 and G1–G7.

Reference is now made to FIG. 8, a detailed block diagram of a portion of FIG. 2, showing the relationship of relevant signals and interconnections between the several components shown in FIG. 8. More particularly, FIG. 8 shows the CPU 225, the cache controller 260, the address latch AL and data latch DL, parts of the buffer 240 (see FIG. 2), the cache memory 255 and several additional logic components. These additional logic components include PAL C1, PAL C2, a set, G1–G7, of two input AND gates, an OR gate O1 and latch D1.

Although FIG. 8 shows the discrete logic elements C1, C2, O1 and G1–G7, those skilled in the art will realize that there is wide latitude in packaging different logic functions in different discrete elements. The specific showing in FIG. 8 is more for purposes of explanation and description than for instructions on how to package logic functions in different discrete elements.

Two major distinctions between the architecture of FIG. 8 and that recommended by the manufacturer of the 82385 are found in the cache memory 255 and the relationship between the outputs of the CPU 225 and the cache controller 260. More particularly, whereas the manufacturer of the 82385 makes it clear that the maximum capacity of the cache 255 is 32 KB, the cache memory 255 (or Static Random Access Memory—SRAM) has a capacity of at least 64K bytes, divided into 32 KB bank A and a similar 32 KB bank B.

As shown at the top in FIG. 8, address output bits A3–A31 of the CPU 225 are connected to addressing inputs CCA2–CCA29 and CCA31 of the cache controller 260. More particularly, FIG. 8 is intended to represent that bits A3–A30 are connected to terminal CCA2–CCA29 and terminal A31 is connected to terminal CCA31. As shown in FIG. 8, terminal CCA30 is grounded. Address bit A2 forms an input to the PAL C2 and the latch D1. One output of the PAL C2 is a signal NEWA2 which is input to the address latch AL so that the address latch AL can output bits BA2–BA31, where output bits BA3–BA31 correspond identically to input bits A3–A31 and output bit B2 corresponds to input bit NEWA2.

Because the relationship between the cache directory and microcomputer system address structure has been offset, attention must also be paid to the snoop bus. Those skilled in the art are aware that in order to maintain cache coherency, the cache controller 260 must have visibility of memory writing functions. Of course, it has visibility of memory writing functions originated in the CPU 225 due to its connection to addressing and control outputs of the CPU 225. However, in typical microcomputer systems, other devices may also write to memory and hence the cache controller 260 is provided with a snooping function to monitor writing to main memory by other devices. In order to maintain the already offset relationship, the snoop input terminals SA2–SA22 of the cache controller 260 are connected to address bits BA3–BA23, as shown in FIG. 8.

Although not explicitly shown in the preceding figures, a 32 KB cache memory (configured as 4-byte entries) requires 13 addressing bits. However, the 64KB cache memory 255 requires 14 addressing bits. Addressing information shown in FIG. 8 is provided by the output of the latch D1 (12 bits, A3–A14). In addition, cache 255 addressing input A0 (a 13th bit) is provided from CACA2 output of C2. Finally, the effect of a 14th bit is the bank selection created by the cache controller generating either cache enable A (COEA or CWEA) or cache enable B (COEB or CWEB).

Typical microcomputer systems employing cache controllers use a 4-byte line size at least partly because of the width of the data bus, i.e. 32 bits. The width of the data bus means that on a given memory cycle, 32 bits can be extracted from the memory and thus in response to a cache read miss, four bytes or one line of updated information can be written to the cache on a given read cycle. The consequence of changing the line size, as is the case in the present invention, from four bytes to eight, suggests that in order to maintain updating one entire line on a cache read miss, other changes must be made. In a preferred embodiment of the present invention, the additional logic provided by the PAL C1 and PAL C2 provide for a second or hidden memory cycle. This memory cycle is hidden to the extent that it is invisible to the CPU 225 and cache controller 260. Thus, a read miss generates two memory cycles. In a first of the two memory cycles, the address output A2 is inverted (NEWA2) and used along with address bits A3–A31 in a 32-bit memory fetch. The data in that memory cycle is stored in the cache 255. Thereafter, the effect of output A2 is again passed to the system (NEWA2) and the cache RAM 255 (along with bits A3–A31). On this cycle, however, the effect of A2 is not inverted to address a second set of 32 bits from memory. The data read during the second cycle is presented to the processor 225 and is also stored in the cache 255. The additional cycle is created by generating an alternate address strobe signal (MISS1). MISS1 is used by the system bus interface unit (Micro Channel (TM) or other system bus) and local bus memory interface as an alternate BADS (82385 address strobe) signal. This additional or hidden cycle looks like a pipelined processor cycle to the system interfaces and therefore either BADS or MISS1 can initiate a bus cycle.

Although MISS1 is used to create an additional or hidden cycle in accordance with the preferred embodiment of the present invention, an alternate arrangement would be to provide a 64-bit wide data bus so that the additional or hidden cycle would be unnecessary, i.e. a single memory cycle would fetch 64 bits of data corresponding to an 8-byte line. A disadvantage of using a 64-byte memory interface would be a requirement for faster DRAMs and SRAMs because of an extra crossover buffer needed to gate the proper data to the CPU 225.

In order to maintain the hidden cycle transparent to the CPU 225 and cache controller 260, the BREADY signal (from the system) is held active until the end of the second read miss bus cycle (both the cycle created by BADS and the additional cycle created by MISS1). The first 32-bit set of data read on the first read cycle is stored in the cache 255 by pulsing SRAMCS2 (chip select) as developed in the PAL C2. This signal is tied to the active high chip select input of the cache 255. SRAMCS2 is normally active, and goes inactive at the end of the first read cycle of a cacheable read miss. It goes active again one CLK2 clock cycle later.

The signals NEWA2, /MISS1, /NEWLA2, /CPUNA, SRAMCS2, /CACA2 and NACACHE are defined below in the eight logic equations.

The logic equations which have been referenced above are reproduced immediately below. In this material the symbols have the following meanings associated with them:

| Symbol | Definition |
| --- | --- |
| / | Negation |
| := | A registered term, equal to |
| = | A combinatorial term, equal to |
| & | Logical AND |
| + | Logical OR |
| $ | Logical exclusive OR (XOR) |

NEWA2 = CA2 $ (NCA & /CWR & MISS1 & SRAMCS2)
/MISS1:=
MISS1 & BUSCYC385 & CPUNA & /BADS & /(BW/R) & CLK & NCA
+ MISS1 & /BUSCYC385 & /BADS & /(BW/R) & CLK & NCA & /BREADY
+ /MISS1 & /CLK
+ /MISS1 & BREADY
/NEWLA2 := /CA2 & MISS1 & CPUNA & CLK
+ MISS1 & /BUSCYC385 & /BADS & /(BW/R) & CLK & NCA & /BREADY & /CA2
+ /NEWLA2 & /MISS1 & CLK
+ /NEWLA2 & MISS1 & /CPUNA & CLK & BREADY
+ /NEWLA2 & /CLK
+ /NEWLA2 & MISS1 & /CPUNA & CLK & BUSCYC385
/CPUNA := /MISS1 & CLK & CPUNA & /NACACHE
+ /MISS1 & CLK & CPUNA & /BREADY & /BUSCYC385
+ /CPUNA & /CLK
+ /CPUNA & /MISS1 & CLK
+ /CPUNA & CLK & BREADY
+ /CPUNA & CLK & BUSCYC385 & NACACHE
SRAMCS2 :=
SRAMCS2 & /MISS1 & /BREADY & /BUSCYC385 & CLK
/CACA2 = /NEWLA2 & /CPUNA & MISS1
+ NEWLA2 & /MISS1
+ /CA2 & MISS1 & CPUNA & CLK
+ /NEWLA2 & MISS1 & CPUNA & /CLK
+ /NEWLA2 & MISS1 & CPUNA & /CA2
/NACACHE = /CASGATE
+ /MISS1 & /CMD
+ RESET
where:
/CASGATE indicates active main memory cycle, active low, and
/CMD indicates an active cycle on a bus other than the system bus (such as Micro Channel), active low.

In the foregoing:
BREADY is a signal from the system bus (active low) indicating that the cycle on the bus has been completed.
CA2 represents the A2 output of the CPU 225,
BADS is the Intel-defined address strobe (active low) from the cache controller 260,
CLK represents an Intel-defined clocking signal,
RESET is the Intel-defined reset signal (active high),
NCA represents a Non-Cacheable Access as defined in the copending applications,
BUSCYC385 is another signal defined in the copending applications.

FIG. 9 is an example of several CPU read commands, the results produced at the cache directory, and particularly the line valid byte, as well as the resulting operation. The example of FIG. 9 is provided under the assumption that prior to step 1 the cache memory has been flushed and therefore prior to step 1 the entire directory is invalid.

Step 1 shows the CPU 255 executing a read command at address 0. In the result column, FIG. 9 shows that two memory fetches are occasioned. In one memory fetch, dword 0 (four bytes) is fetched and stored in the cache. Thereafter, another memory fetch for dword 4 (again four bytes) is also accomplished and stored in cache. The cache directory (see the second column) has the tag valid bit set for directory address 0 and the line valid byte, after updating by the cache controller, is 11111110.

Step 2 is a command executed by the CPU to read memory address 4. In accordance with the prior art techniques, this would be a cache miss since the initial memory fetch (at step 1) would have only fetched four bytes (0–3). However, in accordance with the present invention, the two read memory cycles implemented as a result of step 1 have now provided the cache memory with the contents of the addressed memory location. Accordingly, this command results in a cache hit, no changes are made to the cache directory, and no further data is read from main memory since the data is accessed from cache memory.

Step 3 shows a CPU read at address 8. This results again in two memory cycles, first dword 8 (four bytes) and thereafter dword $C_H$ (another four bytes). The cache directory has the line valid byte updated as shown in the line valid byte column of FIG. 9.

Referring to FIG. 8 and the logic equation for NEWA2, it should first be apparent from FIG. 8 that the signals on the address bus (BA2–BA31) output from the address latch AL include addressing bits A3–A31 directly from the CPU 225 and the signal NEWA2 on the A2 conductor. The signal NEWA2 is generated in the PAL C2, and the first of the logic equations defines that signal. Those skilled in the art will understand from the foregoing description that the signal MISS1 is in one condition during the hidden memory read cycle and in another condition in read cycles other than the hidden read cycle. As a result, while the term CA2 may be constant, the signal NEWA2 is in one condition during the hidden read cycle and in the other condition in other read cycles. This provides for both an inverted A2 bit in the hidden cycle and a non-inverted A2 bit on other memory read cycles. In other words, manipulation of NEWA2 by C2 applies to system address bus (BA2–BA31 output of AL) an address which is not generated by the CPU 225. In particular, during the hidden cycle NEWA2=/A2, which is an address bit not generated by the CPU 225.

It should be apparent from the foregoing that the necessity for the hidden read cycle occasioned by a cache miss (and implemented by /MISS1) is a result of the fact that the data bus is not wide enough to accommodate the new line size (eight bytes). Accordingly, the hidden bus cycle can be eliminated if the data bus were sufficient to accommodate the line size.

The first two terms in the equation for /MISS1 show the conditions for generating the "hidden" cycle. /NCA high indicates that the asserted address is cacheable. /BADS active indicates either a cache miss or a non-cacheable cycle. However the joint activity and of NCA and /BADS are specific to a cache miss. Finally /(BW/R) active indicates a read. Thus jointly the three signals are specific to a cache read miss, just the conditions for creating the "hidden" cycle. The first of the terms is operative for non-pipelined cycles (CPUNA) whereas the second term is operative for pipelined cycles (BREADY). The last two terms are operative to terminate /MISS1 at the appropriate time.

Just as NEWA2 toggled on a given read miss from the CPU to create the two addresses, one on the "hidden" cycle and the other for the read miss initiated by the CPU (one address is created with NEWA2 high and the other address is created with NEWA2 low) so too the addressing to the Cache 255 must toggle. In other words a cache read miss will result in a cache write. The CPU 225 and cache controller 260, since they see only one cycle will create only a single cache address. The A2 address bit from the CPU does not directly reach the address input of cache 255. Rather the effect on A2 is reproduced by the CACA2 bit. However that bit will also toggle just as NEWA2 toggled the address on the system bus. NEWLA2 is created to reproduce the A2 bit of the CPU. The toggling of CACA2 occurs by the changing state of MISS1.

For a similar reason SRAMCS2 is also created. In addition to creating an additional address input to the Cache (one not created by the CPU) it is also necessary to make two control cycles to the Cache 255 out of a single cycle created by the cache controller. That is the function of SRAMCS2. SRAMCS2 toggles just at the end of the first, or the "hidden" cycle to initiate the second cycle to the cache memory 255.

As defined in the copending applications CPUNA is the signal, which when asserted, enables the CPU to pipeline a cycle. MISS1 is included in the development of CPUNA to ensure that the completion of the "hidden" cycle does not allow assertion of CPUNA. This action prevents the CPU from going off on a pipelined cycle before the second half of the read miss sequence (consisting of two cycles) can be completed.

While the preferred embodiment of the invention has been described in connection with the 82385 cache controller, those skilled in the art will understand that, employing the principles of the present invention, the cache memory supported by other cache controllers can be increased by the technique described herein, i.e. shifting the relationship between the CPU address outputs and the cache controller address inputs. This increase in supported cache memory does not require alteration to the internal cache directory or other internal components of the cache controller to the extent that the supported cache capacity is increased by increasing the line size. In microcomputer systems wherein the data bus can support single cycle transfers at the new line size, then there is no necessity for using the other technique of the present invention, i.e. the hidden read cycle. On the other hand, if increase to supported cache capacity requires increasing the line size beyond the width of the data bus, then the technique of introducing a hidden read cycle, as described herein, can also be employed to overcome this problem. It should also be apparent that there is, in theory, no reason why only a single hidden read cycle is employed. In other words, with appropriate address offset and multiple hidden cycles, the supported cache capacity can be increased beyond the 100% (from 32KB to 64KB) described herein.

In view of the foregoing, it should be apparent that many changes can be made to the preferred embodiment described herein to increase the supported cache capacity of a given cache controller within the spirit and scope of the present invention. Accordingly, the spirit and scope of the invention is to be construed not by the example described herein but by the claims attached hereto.

We claim:

1. A multi-bus microcomputer system comprising:
   a CPU and a cache subsystem connected together by a CPU local bus, said cache subsystem including a cache controller and a cache memory, system bus means connecting said cache controller to a random access memory and a plurality of addressable functional units, wherein said CPU has CPU addressing outputs and said cache controller has addressing inputs, and means connecting some of said CPU addressing outputs to some of said addressing inputs of said cache controller so that said some of said CPU addressing outputs are not connected to corresponding addressing inputs of said cache controller.

2. A multi-bus microcomputer system as recited in claim 1 which further includes:

address logic generator means for generating an addressing input to said random access memory and means connecting at least one of said CPU addressing outputs to said address logic generator means.

3. A multi-bus microcomputer system as recited in claim 1 or 2 wherein said cache controller is an 82385 cache controller, and wherein said cache memory has at least 64 Kbyte capacity.

4. A multi-bus microcomputer as recited in claim 2 wherein the addressing input to said random access memory generated by said address logic generator means differs from address signals at said CPU addressing outputs, 5. A multi-bus microcomputer system as recited in claim 1 which further includes:

address logic generator means for generating an addressing input to said cache memory and means connecting at least one of said CPU addressing outputs to said address logic generator means.

6. A multi-bus microcomputer system as recited in claim 5 wherein:

said address logic generator means also generates an addressing input to said random access memory.

7. A multi-bus microcomputer as recited in claim 6 wherein the addressing input to said random access memory generated by said address logic generator means differs from address signals at said CPU addressing outputs.

8. A multi-bus microcomputer as recited in claim 5 wherein the addressing input to said cache memory generated by said address logic generator means differs from address signals at said CPU addressing outputs.

9. A multi-bus microcomputer system comprising:

a CPU and a cache subsystem connected together by a CPU local bus, said cache subsystem comprising an 82385 cache controller and a cache memory, said CPU including CPU addressing outputs, means connecting some of said CPU addressing outputs to addressing inputs of said 82385 cache controller so that said CPU addressing outputs are not connected to corresponding 82385 cache controller addressing inputs, system bus means connecting said 82385 cache controller to a random access memory and a plurality of addressable functional units, address logic generator means for generating an addressing input to said cache memory, means connecting at least one of said CPU addressing outputs to said address logic generator means, and means connecting CPU addressing outputs to said cache memory, wherein said cache memory has a capacity of at least 64 Kbytes.

10. A multi-bus microcomputer as recited in claim 9 wherein the addressing input to said cache memory generated by said address logic generator means differs from address signals at said CPU addressing outputs.

11. A multi-bus microcomputer system as recited in claim 9 wherein:

said address logic generator means generates an addressing input to said random access memory.

12. A multi-bus microcomputer as recited in claim 11 wherein the addressing input to said random access memory generated by said address logic generator means differs from address signals at said CPU addressing outputs.

13. A multi-bus microcomputer system as recited in claim 11 or 2 which further includes hidden cycle initiating means coupled to said CPU and to said cache controller and responsive to a cache read miss identified by said cache controller for generating a hidden memory read cycle.

14. A multi-bus microcomputer system as recited in claim 11 or 2 wherein CPU addressing outputs A3 through A30 are connected to addressing inputs CCA2 through CCA29 of said cache controller and CPU addressing output A2 is connected to said address logic generator means.

* * * * *